United States Patent [19]

Hansson et al.

[11] Patent Number: 4,513,121

[45] Date of Patent: Apr. 23, 1985

[54] WET STRENGTH MATERIAL

[75] Inventors: Per E. A. Hansson; Felek Jachimowicz, both of Columbia, Md.

[73] Assignee: W. R. Grace & Co., New York, N.Y.

[21] Appl. No.: 476,584

[22] Filed: Mar. 18, 1983

[51] Int. Cl.$^3$ .............................................. C08S 8/32
[52] U.S. Cl. .............................. 525/332.3; 525/333.1; 525/333.2; 525/379
[58] Field of Search ............... 525/333.3, 333.1, 333.2, 525/374

[56] References Cited

U.S. PATENT DOCUMENTS 4,233,417 11/1980 Van Eenam ..................... 525/379
4,312,965 1/1982 Jachmowicz et al. ............ 525/379

Primary Examiner—Joseph L. Schofer
Assistant Examiner—Bernard Lipman
Attorney, Agent, or Firm—Howard J. Troffkin

[57] ABSTRACT

A process and product formed therefrom for imparting wet strength to cellulosic sheet materials by incorporating into the materials a polymeric product having the structural characterization of a substantially completely saturated hydrocarbon polymer chain with pendant secondary and/or tertiary alkylene amine groups and alkylene quaternary ammonium groups.

6 Claims, No Drawings

WET STRENGTH MATERIAL

BACKGROUND OF THE INVENTION

The present invention is directed to a composition capable of imparting wet strength to cellulosic sheet products and to the resultant product.

"Cellulosic sheet materials" and "paper products" are terms used herein to include all sheet and sheet like products made from or containing cellulosic fibrous materials. Such products include paper, cardboard, corrogated board and the like.

Cellulosic fibers are hydrophilic and hence are readily wetted and swollen by water. The surfaces of these swollen fibers, when compacted into a web as in paper sheet formation, come together in close contact. As water is removed by drying, interfiber bonding forces develop between the adjacent surfaces. This bonding provides strength and coherence to the finished sheet. Conversely, when such a sheet is rewetted, the fibers swell, the interfiber bonding is weakened, and the paper loses most of its strength. Precise testing of various papers made from different pulps and with various manufacturing conditions but without artificial bonding shows a range of tensile strength retention from about 1 to about 8 percent on complete saturation with water. Until comparatively recently, most paper was used for writing, printing, and illustrating. For such uses the property of wet strength was relatively unimportant. As paper increased in abundance and was applied for a wide variety of uses, it became apparent that some of these uses would be benefited if the paper possessed greater strength when wet.

A series of discoveries in the later 1930s and early 1940s opened the door to mass production of wet-strength paper. It was shown that the use of certain thermosetting resins, particularly the aminoplasts, urea-formaldehyde (UF) and melamine-formaldehyde (MF), dramatically improved the wet strength of paper. These resins were applied to the fiber in the water-soluble, monomeric, or intermediate stage of polymerization. Subsequently, the adsorbed resin was cured to the insoluble condition and wet strength became evident. In the early days of this development, the resins were applied to the already formed sheet as an impregnating solution. Soon, however, resins were developed that were substantive to cellulosic fibers. Such resins could be added to paper stock prior to sheet formation, be adsorbed by the fiber, and eventually cured to produce the wet-strength property.

A wet-strength paper product shows extraordinary resistance to rupture or disintegration when saturated with water. Wet strength is distinguished from water repellancy or resistance to wetting. To the extent that a paper remains unwetted, even in contact with water, strength will be retained. All papers can be wetted under proper conditions, and to measure wet strength, the wetting liquid must be water.

The three major types of resins in current use are urea-formaldehyde resin, melamine-formaldehyde resin and polyamide-polyamine-epichlorohydrin (PPE) resins. The former two require acidic conditions which are normally associated with high degrees of corrosion in the paper machine system and to paper products of inferior nature. The PPE resins carry large amounts of amide groups particularly in the polymer backbone which, although aiding in imparting water solubility to the resin, does not effectively aid in wet strength. Overall, these polymers must be used in high dosages to provide any desired degree of wet strength.

There is a need to have resin which is capable of being incorporated into a paper product and effectively imparting a high degree of wet strength to the product even when used as low dosages than some of the previous known and used compounds.

SUMMARY OF INVENTION

A process and a sheet product formed by the process for imparting wet strength to paper products by contacting the cellulosic fiber used to form the product with a polymer characterized by the formula

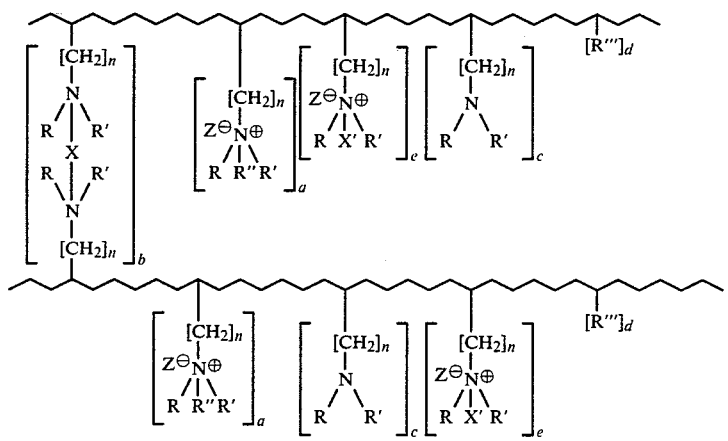

wherein each R independently represents a substituted or unsubstituted $C_1$–$C_6$ alkyl, cycloalkyl or aryl group; R' represents hydrogen or an R group; R" represents hydrogen or a $C_1$–$C_3$ alkyl; R''' represents hydrogen or comonomer pendant group or both; X is a residual organic group of a polyfunctional compound capable of reacting with at least two amino groups of the polyamine; X' is a residual organic group having at least one unreacted functional group capable of reacting with secondary or tertiary amine or secondary hydroxy groups; ~~~~~~ represents a substantially saturated hydrocarbon polymer chain; z represents an ammonium counterion; n is an integer of from 1 to 3; and a, b, c, d and e are each integers such that a, c and e are each from about 1 to 90 percent, b is from about 1 to 30 percent and d is from about 1 to 60 percent of the total sum of a+b+c+d+e and the sum of the groups a, c and e is at least 4 weight percent of the polymer product.

DETAILED DESCRIPTION

The polymeric material found useful in the present invention has a unique structure of having a substantially saturated hydrocarbon polymer backbone chain, having pendant secondary and/or tertiary and quaternary alkylene amino groups; being of a high molecular weight; being water soluble and having a reactive moiety pendant from the chain through a quaternary ammonium group, said moiety being capable of reacting with an amine group under suitable conditions. The resultant polymer has high charge density which provides strong polymer-particle surface interaction. This plus the polymer mass configuration provides excellent characteristics for use as a wet strength agent for paper products.

The useful product of the present invention can be formed by first aminomethylating an olefinic containing polymer under conditions to cause high amine incorporation. The resultant polymeric polyamine is then modified by reacting the polymeric polyamine with a difunctional reagent in which each functionality is capable of reacting with a secondary and/or tertiary amine or hydroxyl group of cellulose.

The initial polymer is preferably formed by aminomethylation of a polymeric material having a multiplicity of olefinic groups (non-aromatic unsaturation) within the polymer structure. The olefinic containing polymers useful herein can be formed from monomers having multiple olefinic groups therein alone (homopolymers), or in combination with other monomers, by conventional cationic, anionic, free radical, coordination or supported metal catalytic processes, as are well known by the artisan. The term "olefinic containing polymer" or "olefinic prepolymer", as used herein, is meant to define homopolymers and copolymers which contain a multiplicity of olefinic bonds distributed throughout the polymer chain either as a part of the polymer backbone or as a part of the pendant group. The olefinic containing polymer should have a molecular weight of at least 500 and preferably from about 1000 to 1,000,000. It is most preferable to utilize an olefinic polymer of molecular weight of from 1,000 to 200,000.

The olefinic containing polymers useful herein can be homopolymers formed from $C_4$ to $C_{10}$ monomers having multiple olefinic groups therein, such as, for example, from butadiene; isoprene, pentene, cyclopentadiene; dimers of cyclopentadiene; 1,3-pentadiene; 1,4-pentadiene; 1,3-hexadiene; 1,4-hexadiene; 1,5-hexadiene; 2,4-hexadiene; 1,3,5-hexatriene and the like, as well as such monomers containing substituents thereon which are inert with respect to aminomethylation, such as $C_1$–$C_3$ alkyl, halo and carbonyl radicals. Further, the polymers useful herein may be copolymers formed from at least one monomer compound which is capable of forming polymeric segments containing olefin bonds therein, such as copolymers formed from more than one monomer capable of imparting olefinic groups to the polymer such as, for example, copolymers of poly(butadiene-isoprene), poly(butadiene-1,4-pentadiene) and the like as well as copolymers having one copolymerizable monomer not forming olefinic groups to the polymer segments, such as acrylamides, acrylonitrile, styrene, actylates, alkyl vinyl ethers, alkyl vinyl ketone and the like, and mixtures thereof, and $C_1$–$C_{20}$ hydrocarbyl derivates of such monomers, such as alpha-methyl styrene, methyl methacrylate and the like. Such materials are formed in conventional manners by free radical, cationic or anionic polymerization techniques, as are well known. A large variety of these polymers can be readily obtained commercially, such as polybutadiene, hydroxy terminated polybutadiene poly(butadiene-acrylonitrile), poly(butadiene-styrene), and the like. The olefinic containing polymers used to form the initial polymeric polyamine should contain at least about 10 percent by weight of olefinic group segments (C≡C) therein to provide sufficient reactive sites for forming alkylene amine pendant groups. The preferred starting polymers are homopolymers of polybutadiene.

The olefinic containing polymer is reacted with carbon monoxide, hydrogen and/or water (preferably hydrogen alone) and a primary or secondary amine in the presence of catalytic amount of a Group VIII (of the Periodic Chart) metal compound such as inorganic salts, carbonyls and the like or organometallic compounds such as carboxylic acid salts, chelates such as of norbornadiene and the like. The metal is preferably selected from the Group VIII metals of rhodium, ruthenium, iridium or mixtures thereof. The most preferred catalysts are compounds having rhodium alone or with ruthenium.

Aminomethylation of the polymer requires the utilization of CO and $H_2$. These gases can be in a molar ratio of from 1:10 to 10:1 with from 2:1 to 1:2 being normally preferred. Other inert gases such as argon, nitrogen and the like can be present and used to form a part of the total reaction pressure as described below.

The amine can be a primary or secondary amine represented by the formula

wherein R' represents a hydrogen, $C_1$–$C_6$ alkyl, cycloalkyl or aryl group and R represents a $C_1$–$C_6$ alkyl, cycloalkyl, or aryl group. Any of the groups may be substituted with a group which is nonreactive to aminomethylation such as ethers or alcohols. It must be recognized that the groups should be sufficiently small to provide little or no steric hinderence in the further reactions that the nitrogen atom subsequently undergoes as described hereinbelow. Therefore, it is preferred that each R' and R represents a $C_1$–$C_3$ alkyl group.

The aminomethylation is carried out in the presence of a Group VIII metal compound. The metal is preferably rhodium or a mixture of rhodium with a second Group VIII metal especially with ruthenium or with iridium. The mixture can be of a ratio of from about 1000:1 to 1:1000 with 100:1 to 1:100 being preferred.

Hydrogen is the preferred hydrogen source in the aminomethylation of hydrocarbon polymers to achieve high degrees of alkylene amino pendant groups on the polymer chain. Small amounts of water may be present but it is preferred that the reaction be carried out under substantially anhydrous conditions.

The reaction is carried out at temperatures of from about 50° to 250° C. preferably from 100° to 200° C. and for times of from 0.5 to 10 hours, preferably from 2 to 6 hours, under a pressure of from 500 to 2,000 psi. The pressure is generally achieved by the presence of sufficient CO and $H_2$. Additional pressure is attained by the presence of inert gases.

The polymer must have a high degree, generally of greater than about 40 percent and preferably greater than about 50 percent, incorporation of alkylene amino pendant groups based on the original olefinic content of the polymer. High degrees can be achieved by combined use of a Group VIII metal compound especially rhodium or rhodium with ruthenium, hydrogen and high pressure. Further, substantially all of the residual olefinic groups of the polymer are hydrogenated under the above conditions. The polymeric polyamine may contain small amounts of residual olefinic groups such as less than about 20 percent and preferably less than about 10 percent of that originally contained in the polymer. It is most preferred that the polymer be substantially completely saturated.

The polymeric polyamine which can be formed as described above has certain unique structural features which are believed, though not meant to be a limitation on the present invention, to provide a highly effective end product suitable as a wet strength agent. The amino group, being pendant from the polymer backbone chain and extended from the chain by a methylene or other short chain alkylene bridge, is sterically positioned to be more readily accessible to further modification of quaternization and as a site for reaction, as described below, to functionalize the polymer chain and thereby attain the desired reactivity for incorporating the polymer into the paper product. Further, the substantial absence of unsaturation in the polymer provides a more flexible chain which thus more readily permits reaction. Further, both the extended pendancy of the amino groups and the polymer backbone structure have unexpectedly found to provide a material which readily associates itself with the cellulosic fibers and other particles of the furnish aid in its retention in the furnish and in the finished paper product.

The polymeric polyamine is then modified by reacting the polymer with a multifunctional (preferably difunctional) compound. "Functional group" or "reactive group" terms used herein and in the appended claims with respect to the multifunctional compound to refers to a chemical atom or combination of atoms (groups) which are reactive with secondary or tertiary amino groups of the polymer or hydroxyl groups on the cellulose fibers.

Further, the "reactivity" of the functional groups refers to reaction conditions, such as pH of reaction medium, temperature and the like needed to cause the functional group to react with an amino group of the polymeric polyamine.

The reactivity of the functional groups should be such as to permit ready control of terminating the reaction of the functional group with the amine and hydroxyl groups present. For example, epihalohydrin are known to be reactive at certain pH ranges while being substantially inactive at other pH ranges. This pH dependence permits ready control of the reactivity of such compounds. Other compounds having reactivity dependence are polyepoxides glyoxals and the like.

The polyfunctional agent can be reacted with the polymeric polyamine in a liquid solvent, such as disclosed as a solvent for aminomethylation reaction in U.S. Pat. No. 4,297,381 which teaching is incorporated herein by reference as well as mixtures of such liquid together or with water. The liquid should be a solvent for both materials. The reaction may be carried out at temperatures of from about 30° to 120° C. and preferably from 40° to 80° for a period of time sufficient to cause less than complete reaction of the agent and polymer. The reaction should be allowed to occur for a time to allow substantial reactivity of all of the polyfunctional compound to be attached to at least one polymer chain. The polyfunctional compound may, in part, be completely reacted to form a cross-link between two or more polymer chains but at least 20 percent should be only partially reacted to leave a pendant group which has at least one free reactive (with respect to secondary or tertiary amine of the polymer or hydroxy of the cellulose). The amount of time required for completion can be readily determined by standard analytical techniques, such as by following the decrease in the presence of reactive groups by spectrographic analysis for disappearance of presence of reactive group of the polyfunctional agent, as well as by other standard techniques. The particular mode of monitoring the progress of the reaction will depend upon the particular agents used as is well determined by the artisan.

The molar ratio of polyfunctional agent to polymer is extremely critical. The molar ratio of agent to secondary amine of the polymer should be between 0.3 and 1.1. The molar ratio of agent to tertiary amine (when aminomethylated using a secondary amine) should be from 0.5 to 2.2. It is also critical that the molecular weight and/or cross-linking network of the polymer be sufficiently low to provide a water soluble product. The exact molecular weight will depend on the degree of amino groups present, and molecular weight of the starting aminomethylated polymer and the degree of cross-linking which is necessary to form the highest molecular weight, yet water soluble product.

The polymeric polyamine must be modified to transform at least a part of the amino groups to ammonium groups. This can be done by cross-linking through the tertiary amino groups as described above or by transforming some of the amines to ammonium groups as described below or both. Such products are especially useful when applied to alkaline conditions. The ammonium groups will form in situ when used under acidic conditions.

The polymer product may be modified to form quaternary ammonium groups from a substantial portion of the pendant amino groups of the polymer product. This can be readily accomplished by reacting the polymer product with alkyl halides. The alkyl halide is preferably a $C_1$-$C_3$ alkyl chloride although other halogens can be used. Although the reaction can be carried out in an organic medium it is preferable to perform the reaction in the presence of water. The halide forms a counterion to the formed ammonium group.

For illustrative purposes, the polymer product of the present invention can be represented by the general formula:

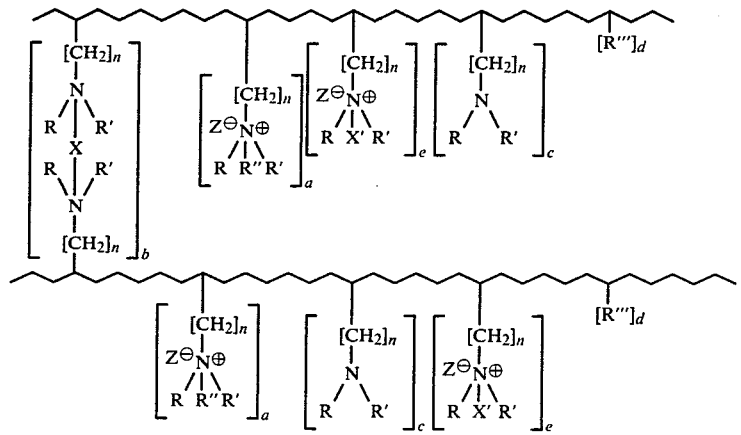

wherein ～～ represents a substantially saturated hydrocarbon polymer chain, each R separately represents hydrogen or an unsubstituted or substituted $C_1$-$C_6$ alkyl, cycloalkyl or aryl; R' represents hyrogen or an R group; R" represents hydrogen or a $C_1$-$C_3$ alkyl; R'" represents hydrogen or a comonomer pendant group or both. X is a residual organic group of a compound capable of covalently bonding with at least two nitrogen atoms of the polymer and Z is a counterion such as a halide; n is an integer of from 1 to 3; a, b, c and d are each integers such that a, c and e is from about 1 to 90 percent, b is from about 1 to 30 percent and d is from about 1 to 60 percent of the total sum of a+b+c+d+e the sum of the groups of a, c and e is at least 4 weight percent of the polymer product.

The resultant polymer has the features of being of being water soluble, having a substantially saturated hydrocarbon polymer backbone structure, and having a high degree of pendant secondary and/or tertiary alkylene amino groups and alkylene quaternary ammonium groups. These features impart to the product a high charge density to provide strong polymer-particle surface interaction and a mass configuration which provides excellent retention of the polymer in the paper furnish and the resultant product. The pendant functionality provides a means by which the polymer is incorporated into the final products. This is done by subjecting the furnish to the appropriate conditions to cause reactivity of the remaining unreacted functional groups. For example, when heat is needed it can be supplied by a series of nip rollers which are also used to dry the paper product. Acidic conditions can be accomplished by conventional means.

The subject polymeric material can be incorporated into aqueous solutions or suspensions to be readily utilized as an additive in the paper making process. Normally the subject material is added to the head box. The polymer is normally present in from about 0.01 to 3 percent by dry weight of the paper product formed although lower or higher concentrations may be appropriate.

The following examples are given for illustrative purposes only and are not meant to be a limitation on the subject invention as defined in the appended claims. All parts and percentages are by weight unless otherwise indicated.

EXAMPLE 1

A series of polymers were prepared according to the present invention and tested for their ability to impart wet strength to paper products. The details of each runs preparation and testing is given hereinbelow. Amounts and results are detailed in Table 1 hereinbelow.

(a) g polybutadiene having a molecular weight of (b) g/mole was diluted with (c) ml of tetrahydrofuran. (d) mg $Rh_6(CO)_{16}$ and (d') g of dimethyl amine were added and the reaction mixture charged into a 2 liter autoclave. The autoclave was charged with a mixture of $CO/H_2$ (1:1) to 1,000 psi. The temperature was raised to 150° C. over 90 minutes and kept there for 4.5 hours. (e) g of polymeric polyamine product was obtained.

Analysis of the resulting polyamine by acid titration showed that (f)% of the carbon double bonds had been aminomethylated. NMR analysis showed the polymer to be substantially free of olefinic bonds.

(g) g of the formed polyamine (containing (h) mmole tertiary amine per g) was evaporated down to (i) g (not to dryness) and diluted with tetrahydrofuran up to (j). (k) g of epichlorohydrin was added. The reaction mixture was heated at 65° C. for 3 hours. (m) g product was obtained.

TABLE 1

|     |         | #1     | #2     | #3     | #4     | #5     |
|-----|---------|--------|--------|--------|--------|--------|
| (a) | g       | 7.5    | 7.5    | 24.1   | 24.1   | 24.1   |
| (b) | g/mole  | 30,000 | 14,000 | 4,500  | 2,800  | 1,000  |
| (c) | ml      | 1,000  | 1,000  | 500    | 500    | 500    |
| (d) | m       | 24.4   | 24.8   | 76.8   | 77.1   | 77.1   |
| (d')|         | 10.03  | 10.0   | 32.5   | 32.2   | 32.2   |
| (e) | g       | 885    | 846.5  | 443.4  | 420.3  | 327    |
| (f) | %       | 50.0   | 53.0   | 57.2   | 68.1   | 47.6   |
| (g) | g       | 684.0  | 7.2    | 390    | 400    | 302    |
| (h) | mmole/g | 0.0797 | 0.0863 | 0.58   | 0.726  | 0.646  |
| (i) | g       | 88     | 96.4   | 72.4   | 65     | 79.7   |
| (j) | g       | 88     | 96.4   | 300    | 300    | 300    |
| (k) | g       | 100    | 100    | 300    | 300    | 300    |
| (l) | g       | 5.04   | 5.69   | 23.0   | 33.6   | 22.6   |
| (m) | g       | 164.3  | —      | 631.7  | 625    | 614    |
| (n) | g       | 158.1  | —      | 332    | 300    | 250    |
| (o) | g       | 0.9    | 1.8    | 2.81   | 3.6    | 1.7    |
| (p) | pH      | 4.0    | 3.9    | 3.9    | 3.3    | 3.3    |
| (q) | g       | 457    | —      | —      | 965    | 883    |
| (r) | g       | 2.7    | 3.2    | 3.0    | 3.4    | 2.5    |

The samples were tested according to the following procedure.

A pulp was produced by high speed mixing in a Braun mixer by adding 20 parts air dry pulp formed from 50 percent hardwood and 50 percent soft wood (300 ml Canadian Standard Feel) to 1000 parts tap water. The material was mixed at maximum speed for 2.5 minutes and diluted with 1830 parts of tap water. The pH was adjusted to 7.8 using 10 percent solution of sodium carbonate. The pulp was allowed to stand for 1 hour and the pH was rechecked and adjusted to 7.8.

Hand sheets were prepared by using 250 parts of the prepared pulp which corresponds to a paper gram weight of 70 g/m² provided the area of the final sheet is 165×165 mm². The wet strength is added to the pulp and stirred with an ordinary laboratory blade stirrer for 2 minutes. A hand sheet was prepared from this pulp. The hand sheet is picked up using blotting paper and placed on a glazed metal sheet. This is repeated to form a pile of blotting paper, hand sheet and metal sheets and pressed for 1 minute at 3 kg/cm². Each of the hand sheets is heated at 105° C. for 15 minutes while contained on a glazed metal sheet. The paper sheet is now lifted off the metal sheet and conditioned to room temperature and humidity conditions for at least 45 minutes.

From each sheet was cut a series of strips of 10.0 mm in breath. 5 strips from each were immersed in distilled water for 30 minutes and then placed between blotting paper and twice rolled with a 1 kg roller. Each strip was placed in a tear strength tester and its test strength was determined according to the standard procedures of Scandinavian Pulp, Paper and Board Testing Committee. The results are given in Tables 2 and 3 below.

TABLE 2

WET STRENGTH TEST AT pH 8.5
Relative Wet Strength in Percent

| | Addition Level | | | |
|---|---|---|---|---|
| | % Dry Polymer per Ton Air Dry Pulp | | | |
| Sample # | 0.1% | 0.25% | 0.50% | 1.0% |
| 1 | 2.92 | 4.78 | 7.18 | 10.5 |
| 2 | 3.72 | 7.26 | 11.2 | 17.15 |
| 3 | 6.56 | 10.1 | 15.7 | 25.15 |
| 4 | | | | 22.2 |
| 5 | | | | 11.3 |

TABLE 3

WET STRENGTH TEST AT PH 6.5
Relative Wet Strength in Percent

| | Addition Level | | | |
|---|---|---|---|---|
| | % Dry Polymer per Air Dry Pulp | | | |
| Sample # | 0.1% | 0.25% | 0.50% | 1.0% |
| 1 | 1.74 | 4.10 | 6.19 | 9.22 |
| 2 | 4.0 | 7.78 | 10.4 | 16.8 |
| 3 | 5.9 | 10.24 | 15.5 | 22.8 |

What is claimed is:

1. A polymeric product comprising a water soluble polymer having a substantially completely saturated polymeric backbone chain with a pendant alkylene amine groups represented by the formula:

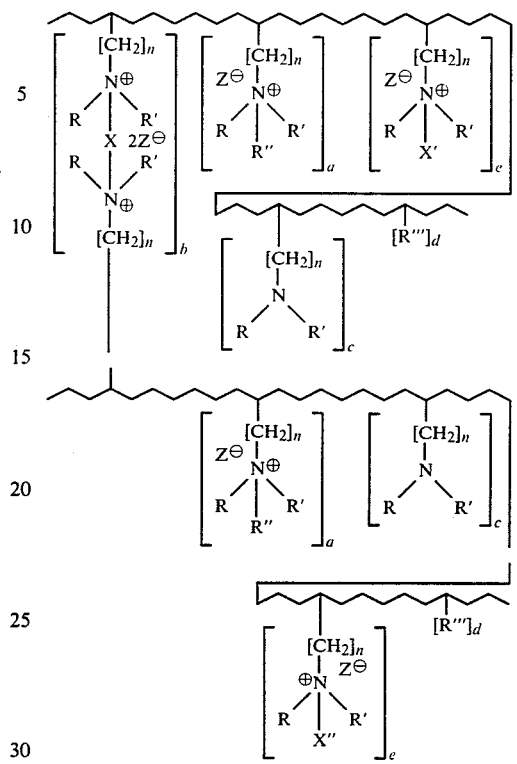

wherein represents a substantially saturated hydrocarbon polymer chain, each R separately represents an unsubstituted or substituted $C_1$–$C_6$ alkyl, cycloalkyl or aryl; R' represents hydrogen or an R group; R" represents hydrogen or a $C_1$–$C_3$ alkyl; R''' represents hydrogen or a comonomer pendant group or both, X is a residual organic group of a compound capable of covalently bonding with at least two nitrogen atoms of the polymer; X' represents a residual organic group having at least one unreacted functional group capable of reacting with secondary or tertiary amine or secondary hydroxy group; Z is a counterion; n is an integer of from 1 to 3; a, b, c, d and e are each integers such that a, c and e is from about 1 to 90 percent, b is from about 1 to 30 percent and d is from about 1 to 60 percent of the total sum of a+b+c+d+e; and the sum of the groups of a+c+e is at least 4 weight percent of the polymer product; said polymer is formed by reacting under substantially anhydrous conditions an olefinic bond containing polymer with an amine selected from a primary or secondary amine, hydrogen and carbon monoxide in the presence of a Group VIII metal containing compound to form a polymeric material having pendant alkylene amine groups and further reacting a portion of the alkylene amine groups with an agent which is at least difunctional with respect to the pendant secondary and tertiary amino groups, said difunctional agent being in molar ratio of from 0.3 to 1.1 with respect to said secondary amino groups and from 0.5 to 2.2 with respect to said tertiary amino groups.

2. The product of claim 1 wherein the polymeric material has pendant alkylene amine groups in at least 40 percent based on the olefin bond content of the olefinic bond containing polymer.

3. The product of claim 1 wherein at least a portion of said alkylene amine pendant groups are reacted with an alkyl halide to form quaternary ammonium groups therefrom.

4. The polymer of claim 1 wherein the olefinic containing polymer is a homopolymer or copolymer of polybutadiene or isoprene.

5. The polymer of claim 1 wherein the olefinic containing polymer is a homopolymer or copolymer of polybutadiene or isoprene.

6. The polymer of claim 3 wherein the olefinic containing polymer is a homopolymer or copolymer of polybutadiene or isoprene.

* * * * *